J. H. GREER.
TRAP.
APPLICATION FILED AUG. 18, 1919.

1,343,502.

Patented June 15, 1920.

Inventor
James H. Greer

UNITED STATES PATENT OFFICE.

JAMES H. GREER, OF ROBINSON, KANSAS.

TRAP.

1,343,502.  Specification of Letters Patent.  Patented June 15, 1920.

Application filed August 18, 1919. Serial No. 318,241.

*To all whom it may concern:*

Be it known that I, JAMES H. GREER, a citizen of the United States, residing at Robinson, in the county of Brown and State of Kansas, have invented certain new and useful Improvements in Traps, of which the following is a specification.

This invention relates in general to traps and more specifically to a fly trap.

One object of this invention is the production of a fly trap wherein a framework is provided to support the wire mesh panels while entrance cones are included to allow flies to easily pass into the interior of the trap.

Another object of this invention is the production of a fly trap wherein the framework is constructed to support the bottom of a trap above a support upon which the trap is mounted so that bait cups may be positioned below the entrance to the cones, whereby flies which pass upwardly from the bait cups will pass into the cones and finally into the interior of the trap.

Another object of this invention is the production of a fly trap wherein the bottom is formed of wire mesh so that the bait cups will be in a lighted area and flies will be attracted to the cups without becoming suspicious or frightened by a dark space underneath the trap, the mesh bottom also being provided with openings around which the wire mesh is bent upwardly to form receiving flanges over which the cones may be secured.

One practical form of construction and assembly of the present invention will be hereinafter described and is illustrated in the drawing, wherein—

Figure 2:
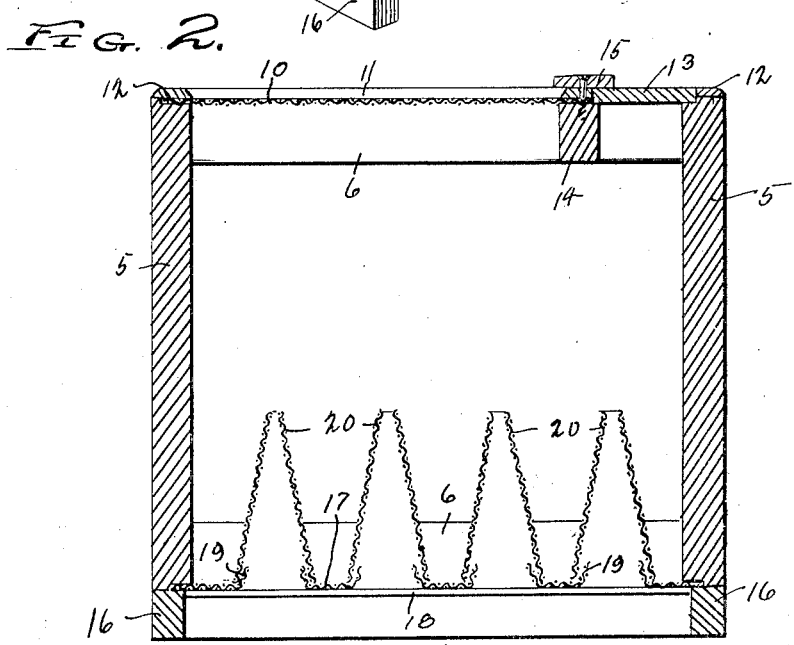
Fig. 2 is a central vertical section through the device.

In the preferred embodiment of the present invention, about to be specifically described, the framework of the trap comprises end walls 5 connected at their side edges adjacent their lower and upper ends by longitudinally extending bars 6. Wire mesh panels 7 are positioned on the bars 6 and are retained in position by longitudinally extending strips 8 and vertically extending strips 9, the former engaging the longitudinally extending bars 6 and the latter engaging the side edges of the end walls 5. Thus the side panels 7 and end walls 5 form a rectangular body. The top mesh panel 10 is positioned upon the upper longitudinal bars 6 and the upper edges of the end walls 5 being retained by longitudinal strips 11 and a transverse strip 12. The removable closure 13 which engages the upper edge of one end wall 5 is provided with and is also supported upon a transverse bar 14 as shown in Fig. 2. A button 15 is pivoted upon this transverse bar 14 for engaging the closure 13 and releasably holding the same in a set position. It will be seen that this closure is carried upon one end wall 5 and for this reason when removed, the trap may be turned on end to allow the dead flies to fall onto the end wall and then the trap may be turned over so that the flies will fall through the opening normally closed by the member 13.

Figure 1:
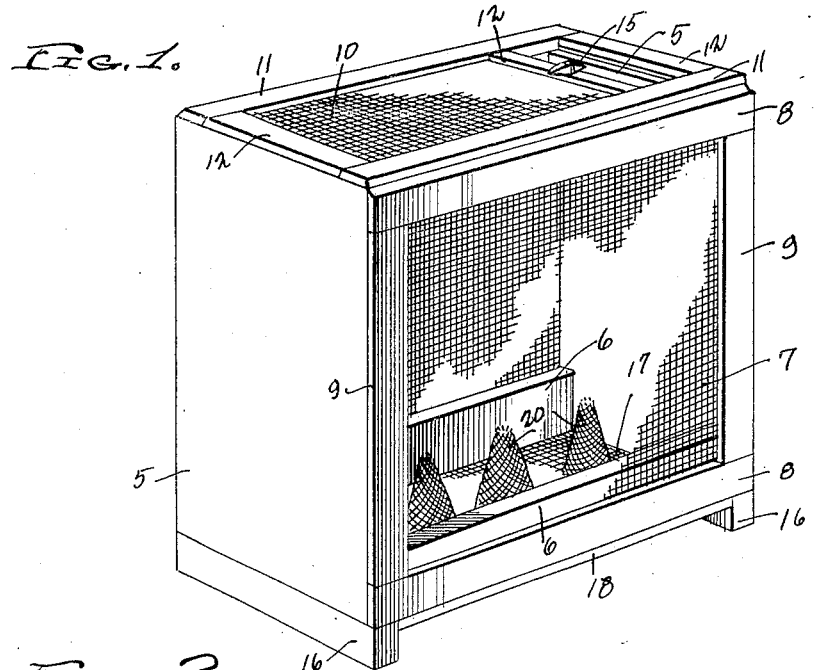
Figure 1 is a detail perspective view of the trap portions of the panels being broken away.

Supporting bars 16 are secured to the lower edges of the end walls 5 as shown in Figs. 1 and 2 and thus support the body of the trap in an elevated condition upon a support upon which the same is mounted. The bottom panel 17 is also formed of mesh and is secured by strips 18 and the bars 16 upon the lower portions of the rails 5 to the bars 6. Thus this bottom panel 17 will be held in a horizontal position and constitutes the bottom of the trap. In view of the fact however that the side panels 7 are of mesh as is the top panel 10, light will pass through the sides and top panels as well as through the bottom panel 17 so as to light the area below the trap when the same is mounted upon a support. This bottom panel 17 has a plurality of entrance openings formed therein surrounded by upstruck flanges 19 over which the entrance cones 20 are placed. These cones are largest at their bases as shown in Figs. 1 and 2. The flanges 19 may be secured to the bases of these cones 20 thus firmly supporting the cones in fixed positions.

When the device is in use, it is positioned upon a support to have the bottom panel 17 spaced above the support. Bait cups or bait of any description may be placed upon the support just below the entrance to the cones 20. As is well known, it is the habit of the fly after eating to fly upwardly and as a consequence after moving upwardly from the bait cup or bait positioned below a cone the fly will pass into the lower portion of a cone. Upon finding itself entrapped in such cone, it is the habit of a fly to crawl upwardly and not downwardly. Accordingly, the fly will pass through the reduced end of the cone into the interior of the trap. As above stated, in view of the fact that the area below the trap is well lighted a fly will have no hesitancy in passing under the bottom panel to the point where the bait is carried. The cones are efficiently connected to the bottom panel owing to the manner in which the flanges are struck upwardly and are received within the bottoms of the cones as stated.

It will therefore be seen that a very efficient fly trap has been produced which may be used as long as desired before being emptied and which at all times is in condition for operation. Owing to its simple construction the cost of production is greatly minimized while its simplicity also reduces the chances of the device becoming inefficient when in operation due to a complicated construction. The manner in which the panels are formed also allows the area beneath the trap to be seen under all conditions, while the bottom panel is constructed to provide entrance openings around which are formed flanges over which are positioned the cones to cause the cones to be secured in proper positions over the entrance openings into the trap.

The foregoing description and the drawings have reference to what may be considered the preferred or approved form of my invention. It is to be understood however, that I may make such changes in construction and assembly of parts, materials, dimensions, et cetera, as may prove expedient and come within the scope of the appended claims.

Having thus fully described my invention what I claim as new and desire to secure by Letters Patent is:—

1. A fly trap comprising a wire mesh bottom, said wire mesh bottom provided with entrance openings therein and having upstruck inwardly inclined flanges formed around the periphery of said entrance openings, tapering cones formed of wire mesh material fitting over said inwardly inclined flanges whereby the cones will be firmly anchored in engagement with the wire mesh bottom, and a housing for receiving said bottom and cones.

2. A fly trap comprising a housing, a cover therefor, a wire mesh bottom having the edges thereof clamped within said housing, said bottom provided with a plurality of entrance openings formed therein, upstanding inwardly inclined wire mesh flanges formed around the periphery of said entrance openings, wire mesh cones having their lower enlarged ends fitting snugly over said flanges whereby the cones will be firmly anchored in engagement with said wire mesh bottom and flanges, and a suitable door formed in said housing for facilitating access to the interior of said housing.

In testimony whereof I affix my signature in presence of two witnesses.

JAMES H. GREER.

Witnesses:
CLEMENT IDOL,
HARRY WEIBLING.